(12) United States Patent
Ridgway et al.

(10) Patent No.: US 7,841,229 B2
(45) Date of Patent: Nov. 30, 2010

(54) LEAK DETECTING APPARATUS

(76) Inventors: Glen A. Ridgway, 4904 Greenview Dr., Commerce Township, MI (US) 48382; Mark W. Ridgway, 9250 Hickorywood St., White Lake Township, MI (US) 48386

( * ) Notice: Subject to any disclaimer, the term of this patent is extended or adjusted under 35 U.S.C. 154(b) by 441 days.

(21) Appl. No.: 12/074,908

(22) Filed: Mar. 7, 2008

(65) Prior Publication Data

US 2008/0216560 A1    Sep. 11, 2008

Related U.S. Application Data

(60) Provisional application No. 60/906,067, filed on Mar. 9, 2007.

(51) Int. Cl.
*G01M 3/10* (2006.01)
*G01N 3/26* (2006.01)

(52) U.S. Cl. .................. 73/49.7; 73/40.5 R; 73/49.2; 73/49.8

(58) Field of Classification Search .................. 73/49.2, 73/49.3, 49.7, 49.8, 40.5 R
See application file for complete search history.

(56) References Cited

U.S. PATENT DOCUMENTS

| | | | | | |
|---|---|---|---|---|---|
| 3,583,210 | A | * | 6/1971 | Orr | 73/49.2 |
| 5,557,966 | A | * | 9/1996 | Corry | 73/49.7 |
| 5,705,737 | A | * | 1/1998 | Liao | 73/49.7 |
| 5,760,296 | A | * | 6/1998 | Wilson | 73/49.7 |
| 6,318,155 | B1 | * | 11/2001 | Carr | 73/49.7 |
| 6,345,958 | B1 | * | 2/2002 | Chen | 417/63 |

* cited by examiner

*Primary Examiner*—John Fitzgerald
(74) *Attorney, Agent, or Firm*—The Weintraub Group, P.L.C.

(57) ABSTRACT

Apparatus and method for use in testing the fluid tightness of closed vessels or fluid systems, such as found in the pressurized cooling system of an internal combustion engine and the fluid transmission of an automobile. The apparatus is configured to detect and/or quantify fluid leakage from a fluid system that is under pressure, when in use, such as through imperfections in the housing or sealing structure of the fluid system whereby to warn the provider of such fluid system that a leakage condition exists.

20 Claims, 7 Drawing Sheets

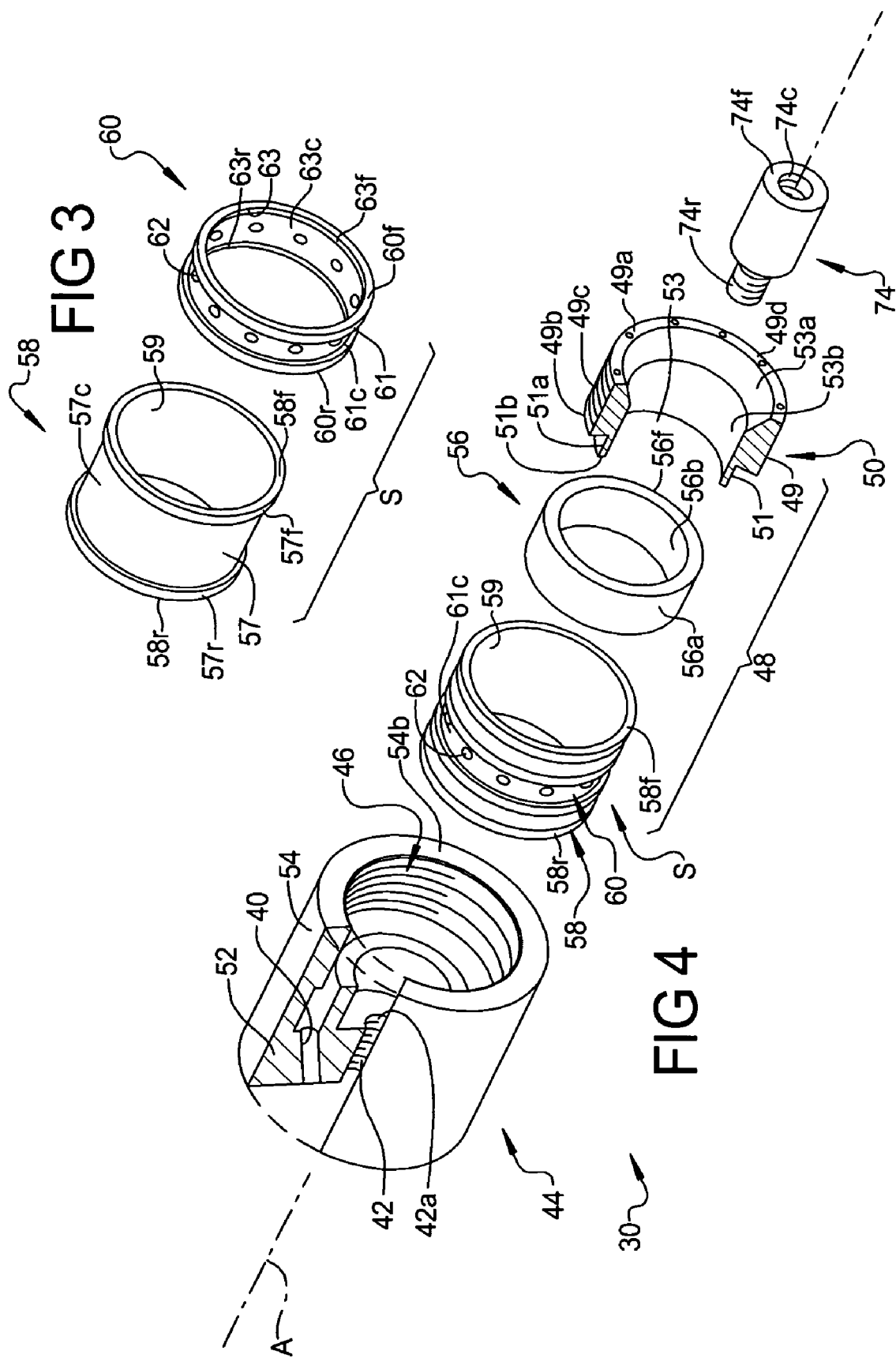

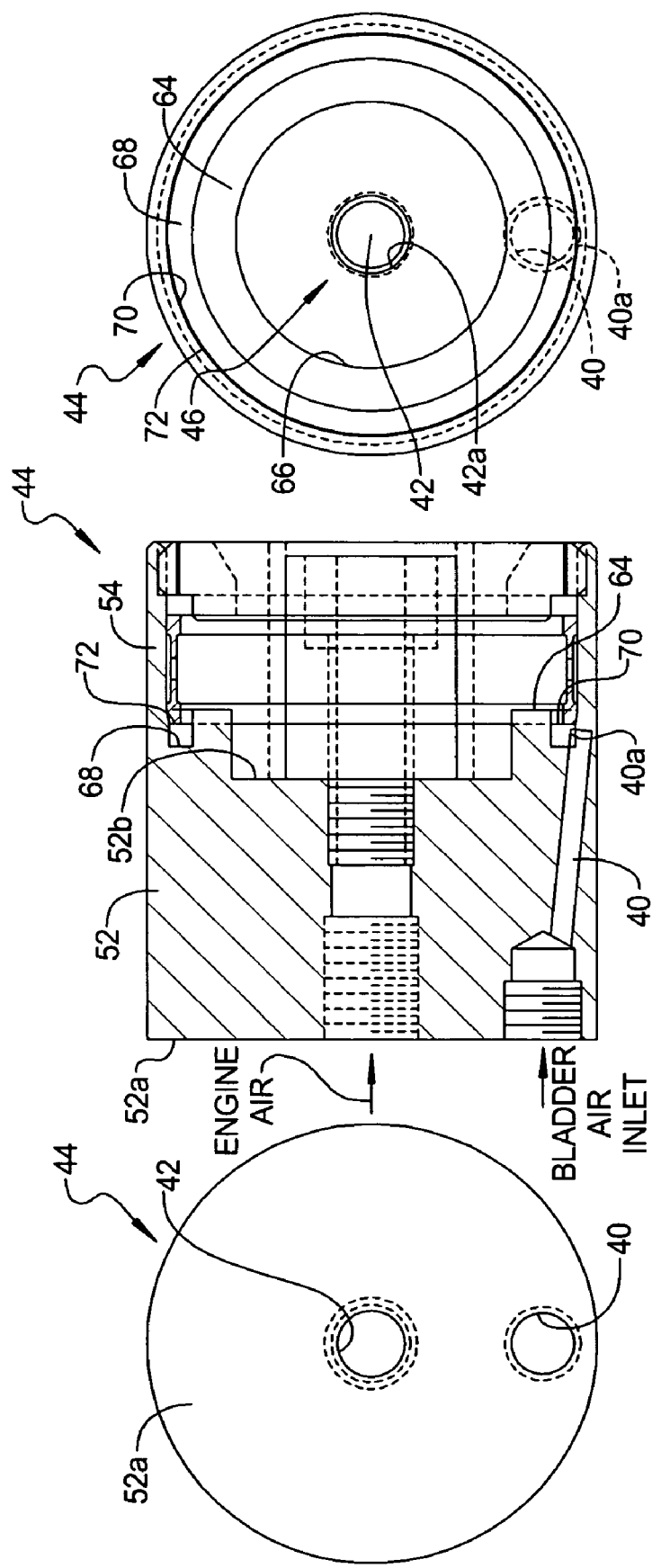

LEAK DETECTING APPARATUS

CROSS-REFERENCE TO RELATED APPLICATION

This application is a completion application of and claims the benefit of U.S. Provisional Application No. 60/906,067, filed Mar. 9, 2007, the entire disclosure of which is incorporated herein in its entirety.

BACKGROUND OF THE INVENTION

1. Field of the Invention

The present invention pertains to apparatus for use in testing the fluid tightness of closed vessels or fluid systems, such as found in the pressurized cooling system of an internal combustion engine and the fluid transmission of an automobile, and more particularly, to apparatus for detecting and/or quantifying fluid leakage from a fluid system that is under pressure when in use, such as through imperfections in the housing or sealing structure of the fluid system whereby to warn the provider of such fluid system that a leakage condition exists.

2. Description of the Prior Art

The automobile is comprised of many components that take many forms and some are very complex, such as the engine and the coolant system for circulating coolant for cooling the engine cylinders. The engine is assembled from separate parts, some possibly die cast, to form a housing having various ports, internal passageways and/or inside chambers, and seals. The walls and junctions of the engine housing may have minor imperfections, and the components, when assembled, may have a gap or minor separation between mated parts, and thus have a potential for developing a leak.

In these systems, fluids are introduced into interior fluid chambers at high positive pressure. Since the fluid system operates at atmospheric pressure, if there is a hole or imperfection in the construction of the fluid system, the pressure differential will cause the fluid inside the system to be forced outside (i.e., develop a vapor leak).

A vapor leak in the engine cylinder can cause a lean condition in the engine air-fuel mixture, which in turn can lead to serious engine damage, such as piston seizure, detonation, and the like. Further, a drop in pressure or a decrease in the amount of pressurized coolant fluid delivered by the vehicle water pump due to leakage may result in a failure of the pump to provide necessary cooling and the engine to overheat.

Importantly, the engine manufacturer wants to minimize the likelihood of leakage because a drop in pressure could affect the performance of the engine and leakage of fluids under pressure could possibly violate various environmental laws. If for some reason the engine has to be recalled to fix a problem, or some other operational reason, this is very expensive and creates customer dissatisfaction with the product. Accordingly, engine manufacturers typically check fluid systems prior to shipping or installation for use.

In general, any fluid system that is to be checked for leakage has an interior fluid chamber, or air space, for receiving a predetermined supply of pressurized fluid. In some cases the volume of the fluid chamber is known, and in others, the volume is not known, or at least not known with any degree of precision. That is, the amount (or mass) of pressurized air required to conduct a fluid leakage test might not be known from unit to unit. For example, in a transmission, the supplier may pre-fill the fluid chamber thereof with a quantity of transmission fluid. As such, neither the internal volume and/or air/fluid percentage of the chamber is known precisely from unit to unit.

Like other forms of nondestructive testing, leak testing has a great impact on the safety or performance of a product. Reliable leak testing saves costs by reducing the number of reworked products, warranty repairs and liability claims. The time and money invested in leak testing often produces immediate profit.

Various apparatus to check for leakage from hydraulic systems and other systems have been proposed. By way of example, attention is drawn to U.S. Pat. No. 3,320,801 (Rhindress, Jr.); U.S. Pat. No. 3,874,225 (Fegel); U.S. Pat. No. 4,047,423 (Eason); U.S. Pat. No. 4,617,824 (Cybulski, et al.); U.S. Pat. No. 5,333,492 (Aarts); U.S. Pat. No. 5,372,031 (Harmand); U.S. Pat. No. 5,760,294 (Lebmann); U.S. Pat. No. 6,351,985 (Bedwell); U.S. Pat. No. 6,619,109 (Dailey et al.); U.S. Pat. No. 6,655,193 (Liu), and U.S. Pat. No. 6,907,771 (Finlay et al.).

These patent documents are believed to disclose improvements in the art that were suitable for the particular problem to be then solved and are listed in recognition of the duty of disclosure of related subject matter which may be relevant as prior art under 37 CFR 1.56.

It is to be appreciated that there is an ongoing need for improvements in the apparatus and methodology for the testing of automobile engines for the presence of a leak prior to being shipped.

Desirably, an apparatus for testing a fluid system for leakage would not require that the volume of the fluid chamber be known, only that the leak test apparatus be capable of attachment to an inlet of the fluid system and, at least in part, cooperate with a source of pressurized fluid to introduce pressurized fluid into the interior chamber of the fluid system and provide an indication that there is, or not, any fluid leakage from the fluid system. In this aspect, hidden internal volumes in a complex fluid system, which could effect leak measurements, should not affect the ability of the leak testing apparatus to test for leakage.

Further, the apparatus for testing for fluid leakage would desirably be inexpensive and not require the leak measuring apparatus to gain physical access into the interior fluid chamber of what is oftentimes a previously assembled/sealed unit.

SUMMARY OF THE INVENTION

The present invention achieves the above desired objects and discloses a method and an apparatus for testing a fluid system adapted to operate under pressure for fluid tightness by detecting and quantifying the presence of a leak from such system whereby to warn the provider of such fluid system that a fluid leak is present in the fluid system being supplied.

According to this invention there is provided an apparatus for leak testing a sealed fluid system having a fluid inlet tube for communicating fluid into an interior fluid chamber of the fluid system. Depending on the application, the apparatus may be hand held, and positioned by the user, or incorporated into a robotically controlled assembly line. The apparatus comprises:

an adapter body including a rearward end wall and a sidewall including a cylindrical inner wall extending forwardly of said end wall to form a cup-shaped receptacle sized to receive and fit about the outer periphery of said inlet tube, and first and second passages, said passages being separate and apart from one another, connectible to a source of fluid at high pressure, and extending from the rearward end wall and opening in said receptacle, and a hollow cylindrical bladder seal disposed in said receptacle and in centered relation with said second passage, said bladder seal having inner and outer surfaces with said outer surface being juxtaposed with and spaced inwardly from the inner wall and said inner surface being adapted to encircle the outer periphery of said inlet tube, when said tube is received in said receptacle, the first passage being adapted to supply pressurized air into the space between the outer surface of the bladder seal and the inner wall of the receptacle and compress the bladder seal radially inwardly and into air tight sealed relation with the outer periphery of the inlet tube, and the second passage being adapted to supply pressurized air into said inlet tube and pressurize said fluid chamber.

According to this embodiment, the apparatus further comprises:

a first and second valve for preventing and permitting pressurized air to pass from the source of pressurized air, the first valve being associated with the first passage and controlling the flow of air into the annular space between the bladder seal and the inner wall of the receptacle, and the second valve being associated with the second passage and controlling the flow of air into the inlet tube, and means for measuring and indicating the decrease, if any over time, of the pressure in the fluid chamber.

The apparatus further comprises a donut shaped sealing assembly disposed in said receptacle, and means for removably retaining said sealing assembly in said receptacle. The sealing assembly comprises an outer support assembly, and the bladder seal. The support assembly includes an outer support ring of relatively inflexible material, and an inner actuating ring of resiliently deformable material, and means for connecting the rings to one another. The bladder seal is of a compressible elastomeric material The rings and bladder seal have outer and inner walls. The outer and inner walls of the support ring each include an annular recess and at least one air passage that passes between the annular recesses. Importantly, the annular recesses cooperate to uniformly distribute pressurized air 360° about the support ring and 360° about the inner actuating ring to uniformly compress an annular wall portion of the bladder seal radially inwardly and about and into air tight sealing relation with the outer periphery of the inlet tube.

As to the support ring, the outer wall and annular recess therein are juxtaposed with the inner wall of the receptacle and the annular recess thereof disposed in fluid communication with the first passage and the annular space between the bladder seal and receptacle wall, and the inner wall and annular recess therein are juxtaposed about and with the outer wall of the actuating ring.

The inner wall of the actuating ring, at least in part, encircles and is abutted against the outer wall of the bladder seal. Fluid under pressure from the first passage passes into the annular space between the bladder seal and the inner surface of the sidewall that forms the receptacle, into and about the outer annular recess, through the air passage, and into the inner annular recess, and around and against the actuating ring. This pressure forces the wall of the actuating ring, at least in part, radially inward against an annular wall portion of the bladder seal and compresses this wall portion of the bladder seal radially inwardly against and about the outer periphery of the inlet tube wherein to form a fluid tight seal about the outer periphery of the inlet tube.

In such sealed connection, pressurized air from the second passage is introduced into the inlet tube, and thereafter into the chamber of the fluid system to be checked for air or vapor leakage.

According to a hand held arrangement, the apparatus further comprises first means for centering and aligning the adapter body with the inlet tube and placing the second passage in direct fluid communication with the inlet tube. According to this arrangement, the first means comprises an elongated hollow centering tube coaxially disposed in said receptacle, at least in part, the centering tube having a proximal end portion connected to said end wall and forming a continuation of said second passage, and a distal end portion adapted to be inserted into the inlet tube and communicate pressurized fluid from the source to said chamber. Preferably, the sealing assembly, centering tube, and second passage are coaxially disposed relative to one another and the receptacle.

According to an embodiment of this invention, a leak check module for detecting fluid leakage from a fluid system comprised of parts separately assembled or cast, the fluid assembly defining an interior fluid chamber and including a fluid inlet tube having a center passage for communicating fluid into the fluid chamber, the leak check module comprising a housing, said housing having a base member and a sidewall extending from the base to form a cup shaped receptacle for receiving and encircling said inlet tube, and first and second fluid passages, said passages separated from one another and connectible to a fluid source for supplying pressurized air into the receptacle, said first fluid passage for communicating pressurized air into the center of said receptacle and into said inlet tube when said inlet tube is received in said receptacle, a tubular bladder seal of a compressible elastomeric material disposed in said receptacle, said bladder seal having inner and outer walls, respectively, juxtaposed with the inlet tube when disposed in the receptacle and with the sidewall of said housing, opposite ends, and an annular wall portion disposed between the ends, first means for engaging and forcing said annular wall portion radially inwardly and from a first position spaced form said inlet tube and into a second position disposed in clamped fluid tight relation with the outer periphery of said inlet tube, said first means being disposed in fluid relation to said second fluid passage, and second means for removably captivating said bladder seal and said first means in said receptacle with said bladder seal having one and the other end distal and proximate to the opening to said receptacle, said second means being proximate to and engaging the other end of said bladder seal.

According to this embodiment of the invention, the first means for engaging and forcing comprises a hollow cylindrical actuating ring of resilient polymeric material, the actuating ring including a cylindrical wall having a medial annular wall portion, a hollow cylindrical packing ring of rigid material, the packing ring having, respectively, an outer and an inner annular recess, and a plurality of fluid apertures extending between the annular recesses, and means for connecting the rings to one another and positioning the fluid apertures and respective recesses to communicate fluid from the first passage and distribute fluid 360° both about the annular recesses and against the annular wall portion.

According to this invention, there is provided instant leak tight connection to formed tube ends such as beads and barbs or threaded portions found on tube assemblies reservoirs and cast parts, and forms a vapor seal by compressing about or gripping the outside of such tube end, such as by gripping barbed or flared or beaded or threaded portions, where the tube is used for connection in use, without damaging the tube portions.

According to another embodiment, a method of leak testing an engine component of the type having a cavity therein through which cooling water can circulate, there being an inlet port which projects from a face of the engine component and communicates fluid into the cavity, which method comprises, associating a testing apparatus, according to this invention, with the inlet port, the associating including abutting an end face of the inlet port with a mating face of the testing apparatus and positioning the bladder seal of the testing apparatus in encircling relation about the outer periphery of the inlet port, and placing the outer wall of the bladder seal in fluid communication with a first fluid passage and the inlet port in fluid communication with a second fluid passage, and thereupon sequentially supplying fluid under pressure to the first and second fluid passages to press the bladder seal into sealing relation about the outer periphery of the inlet port and pass fluid into the second passage and into the cavity through the inlet port inlet, the pressurized fluid establishing a pressure at the inlet to the testing apparatus and an outlet of the cavity, and measuring and comparing the pressures at the inlet and the outlet, leakage from the engine cavity being indicated when the pressure value at the outlet is less than the pressure value at the inlet.

According to this invention, in an embodiment thereof, there is provided a leak testing device for attachment to a fluid system to be leak tested, the system having a sealed interior chamber and a fluid inlet tube having an opening leading to the chamber and connectible to a source to selectively pressurize and depressurize the interior chamber of the fluid system, said device comprising

- a sealing head including a sidewall and end wall, the walls forming a cup-shaped receptacle for receiving and positioning the inlet tube in the receptacle and an annular recess at the junction between the sidewall and the end wall,
- a sealing assembly concentrically disposed in the receptacle and including a bladder seal of compressible elastomeric material and a support assembly, the bladder seal being adapted to encircle the inlet tube when inserted into the receptacle and compress radially inward and into sealed relation with the outer periphery of the tube upon application of an inward force against the outer periphery of the bladder seal, and the support assembly being disposed between the sidewall and the bladder seal and having a lower cylindrical end portion juxtaposed atop the annular recess,
- a first passage for communicating pressurized air from the source into the annular recess,
- means for communicating pressurized air from said annular recess against the outer periphery of the bladder seal wherein to compress the bladder seal radially inwardly and into air tight sealing relation about the outer periphery of the inlet tube without blocking the opening thereof,
- a second passage for communicating pressurized air from the source into the receptacle and into the opening of the inlet tube,
- means for selectively permitting and preventing air to pass from said source to said first and second passages, and
- means for captivating said sealing assembly and bladder seal in said receptacle.

The leak testing device of this embodiment preferably further comprises means for measuring the pressure in the first and second passages, and means for providing an indication of the difference between the pressures over a predetermined time, the difference being reflective of air leaking from the object being tested.

Further, in this leak testing device, the means for captivating comprises a donut shaped closure ring, the closure ring including first face that is juxtaposed against the sealing assembly, and an exterior face, the exterior face being frustoconical and converging inwardly wherein to accommodate radial enlargements on the inlet tube.

The leak testing device, further comprising a handle having opposite rearward and forward end portions, the sealing head being disposed at a predetermined angle relative to the forward end portion and removably mounted thereto and in fluid relation with the source.

In another embodiment reflective of this invention, an apparatus for leak testing a sealed fluid system having a fluid inlet tube for communicating fluid into an interior fluid chamber of the fluid system comprises:

- an adapter body including a rearward end wall and a sidewall including a cylindrical inner wall extending forwardly of said end wall to form a cup-shaped receptacle sized to receive and fit about the outer periphery of said inlet tube, and first and second passages, said passages being separate and apart from one another, connectible to a source of fluid at high pressure, and extending from the rearward end wall and opening in said receptacle, and
- a hollow cylindrical bladder seal having inner and outer surfaces, said bladder seal disposed in said receptacle with the outer surface thereof being juxtaposed with and spaced inwardly from the inner wall and the inner surface thereof being adapted to encircle the outer periphery of said inlet tube, when said tube in received in said receptacle, and center the second passage with the opening at the end of the inlet tube, the first passage being adapted to supply pressurized air into the space between the outer surface of the bladder and the inner wall of the receptacle and against the bladder seal and compress the bladder seal and the inner surface thereof radially inwardly and into air tight sealed relation with the outer periphery of the inlet tube, and the second passage being adapted to supply pressurized air into said inlet tube and pressurize said fluid chamber.

In the aforesaid adapter, there is provided:

- a first and second valve for selectively preventing and permitting pressurized air to pass from the source of pressurized air, the first valve being associated with the first passage and controlling the flow of air into the annular space between the bladder seal and the inner wall of the receptacle, and the second valve being associated with the second passage and controlling the flow of air into the inlet tube and into the fluid chamber, and
- means for measuring and indicating the decrease, if any over time, of the pressure in the fluid chamber.

The adapter is characterized by a donut shaped sealing assembly disposed in the receptacle, and means for removably retaining the sealing assembly in said receptacle. The sealing assembly is disposed in said receptacle and in coaxially centered relation with the centering tube and the second passage opening on the center of the end wall.

Preferably, the adapter further comprises means for centering and aligning the second passage with the inlet tube and placing the second passage in direct fluid communication with the inlet tube. In an aspect thereof, the means for centering comprises an elongated hollow centering tube that is coaxially disposed in said receptacle, at least in part, the centering tube having a proximal end portion connected to said end wall and forming a continuation of said second passage, and a distal end portion adapted to be inserted into the inlet tube and communicate pressurized fluid from the source to said chamber. Preferably, the distal end portion of the centering tube extends from the receptacle and aids the user in placing the adapter relative to and within the inlet tube and to establish fluid relation with the fluid chamber of the fluid system.

In a particular aspect of this embodiment, the sealing assembly comprises:

an outer support assembly, said support assembly including an outer support ring of relatively inflexible material, and an inner actuating ring of resiliently deformable material, and said bladder seal, said bladder seal of a compressible elastomeric material, and means for connecting the rings to one another.

According to this sealing assembly, the rings and bladder have outer and inner walls, the outer and inner walls of the support ring each include an annular recess and at least one air passage that passes between the annular recesses, with the annular recesses in the outer wall and inner wall of the support ring, respectively, being juxtaposed with the inner wall of the receptacle and in fluid communication with the first passage thereof and juxtaposed with the outer wall of the actuating ring, and the inner wall of the actuating ring is abutted against the outer wall of the bladder seal, wherein fluid pressure from the first passage passes into the space between the bladder and sidewall, into the outer annular recess, and through the air passage and into the inner annular recess to force the wall of the actuating ring radially inward against the bladder seal and compress the inner wall of the bladder seal radially inwardly and into sealing relation with the inlet tube.

The present invention will be more clearly understood with reference to the accompanying Drawings and to the following Detailed Description, in which like reference numerals refer to like parts and where:

BRIEF DESCRIPTION OF THE DRAWINGS

FIG. 1A illustrates the shape of the fluid intake port for introducing pressurized fluid into the interior chamber of the water pump;

FIG. 3 is a perspective view showing detail of an intermediate seal actuating ring and an apertured outer packing ring, shown in FIG. 2, positioned for assembly to one another to form a support assembly positionable about an inner bladder seal;

FIG. 4 is a perspective assembly view of the leak check module of FIG. 2 and components thereof positioned for assembly to a closure cup of the leak check module, and wherein certain of the components and closure cup thereof have portions cut-away and are shown in section;

FIGS. 5A, 5B, and 5C are, respectively, a side view, partially in section, an end view, and a front view of the assembled leak check module;

DETAILED DESCRIPTION OF THE PREFERRED EMBODIMENTS

Turning now to the drawings, there is disclosed a leak testing apparatus and a method for use in testing the fluid tightness of a pressurizable fluid delivery system and detecting the occurrence of leaks through passages and imperfections of the fluid delivery system to warn the provider of such delivery system that a fluid leakage condition exists. Importantly, the leak testing apparatus of this invention does not require that the user know the size or volume of the interior chamber or air space of the fluid delivery system being tested.

Embodiments of the leak testing apparatus according to the invention herein are described for use in connection with testing the fluid tightness of a coolant system of an automobile, such as the water pump or the turbine or the compressor unit of an internal combustion engine. However, the invention is not limited to the applications illustrated and may be used on other sealed fluid systems having an interior air space or chamber for receiving a pressurized fluid, such as a fluid transmission system.

Further, embodiments of the leak testing apparatus according to this invention are configured to be hand held and manually positioned relative to parts to be leak tested as well as robotically positioned. Desirably, the components of the leak testing apparatus, whether hand held or robotically positioned, are adapted to enable interchangeability because typically the fluid inlets of the fluid systems to be tested have a like shaped end portion and thus the leak testing components need only be changed in dimension (e.g., diameter). For example, in a hand held situation, the user may rapidly change components of a sealing assembly and thereby reconfigure the leak testing apparatus for use on different coolant systems to be tested. In the situation wherein the tester is adapted for use in an assembly line and positioned by a robot, a bladder seal of the testing apparatus is easily changed to form a fluid seal about the inlet and/or outlet sleeve of a turbine or compressor.

Figure 1:
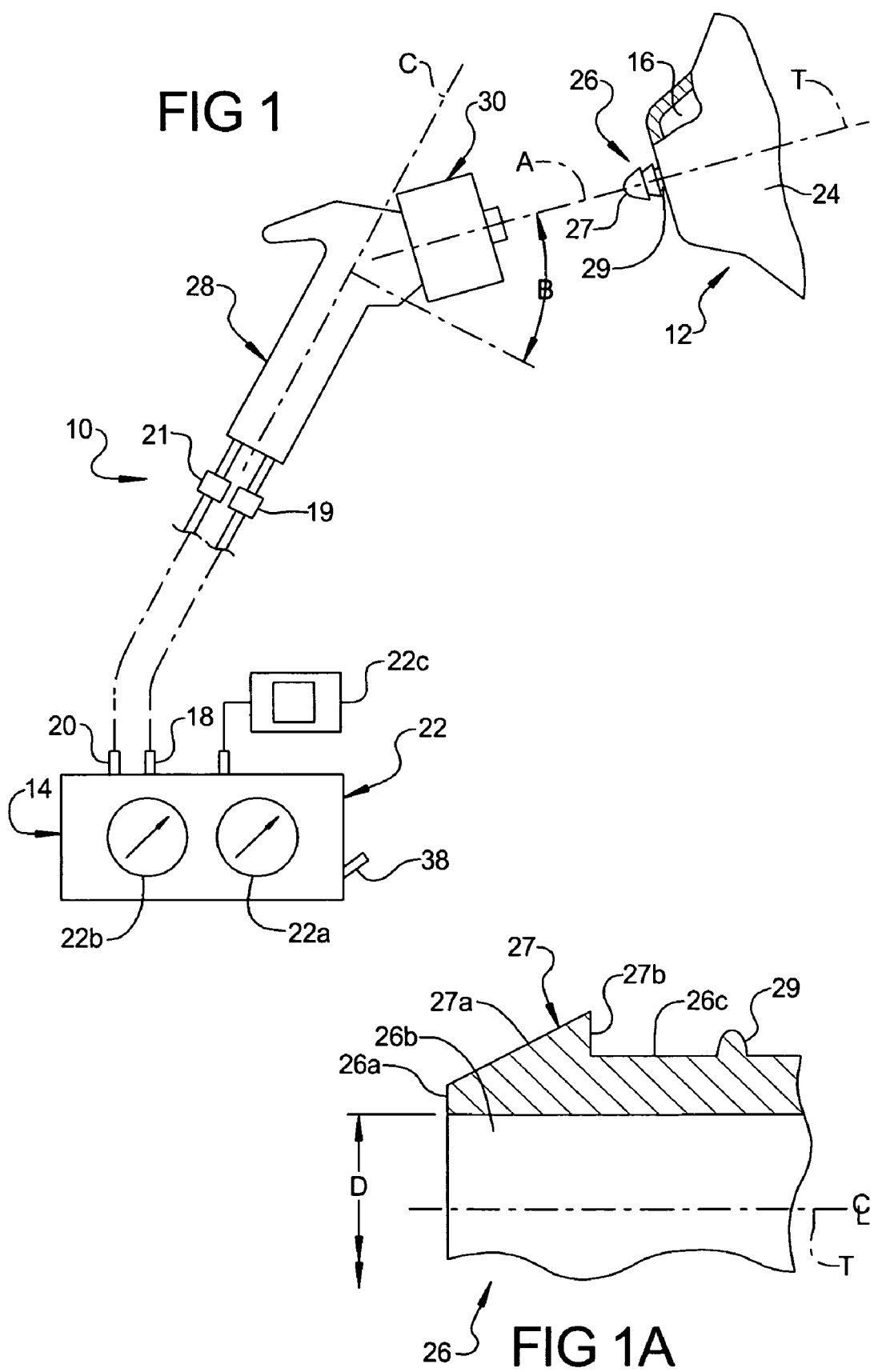
FIG. 1 is a perspective view of hand-held leak check apparatus according to the present invention, wherein a leak check module thereof is connected to a source of pressurized air and positioned for pressure sealed connection to the fluid intake port of a conventional automobile water pump and introduce pressurized air to a closed interior chamber of the pump housing, and wherein a monitoring circuit measures leakage, if any, from the water pump when pressurized.

Referring to FIG. 1, a hand held leak check apparatus according to this invention for detecting fluid leakage from a fluid system, such as from a water pump 12 of an automobile engine, is indicated by the reference numeral 10. The leak check apparatus 10 is adapted to connect to and place a regulatable source of pressurized air, indicated at 14, in fluid communication with and selectively pressurize and/or depressurize an interior chamber 16 of the water pump 12.

The regulatable air source 14 includes a first supply line 18 for supplying pressurized air to a cylindrical sealing assembly 48, which is adapted to encircle an inlet tube 26 of the water pump to be tested, and a second supply line 20 for supplying pressurized air through the inlet tube 26 and directly into the interior chamber 16 of the water pump 12. The supply lines 18 and 20 are separate and apart and not in fluid communication with one another. Each supply line 18 and 20 is regulatable, such as by a suitable check valve 19 and 21, to prevent, supply, or selectively change the amount of pressurized fluid supplied by the source 20 to the part to be tested. A manually regulated check valve 38 permits the user to selectively supply pressurized air to be delivered through the supply line 20.

A monitoring circuit 22 is associated with the pressure source 14 to monitor and measure the air pressure in each supply line 18 and 20, such as illustrated by the pressure gauges 22a and 22b. Further, a read-out gauge 22c operates to provide an output reading of a selected parameter, such as the difference in the readings of the gauges 22a and 22b.

If the parameter being monitored drops in value, or drops in value over a predetermined time and by a predetermined amount, this is an indication of leakage and the water pump 12 is rejected. The leakage may be measured by loss of pressure and/or drop in pressure resulting from the escape of air from the interior chamber 16 of the water pump 12.

For example, depending on the application, the regulatable air source 14 may be set to supply air to the supply line 18, and thus to the sealing assembly 48, at between 80-100 psig, and to the supply line 20, and thus to the interior chamber 16 of the pump housing, at about 60 psig. The leakage readout gauge 22c may read a parameter, such as the actual pressure in the chamber 16, or the drop in pressure in the chamber, or the rate of fluid flow from the chamber. Importantly, the pressure supplied to the line 18 is preferably much higher than that compared to the pressure supplied through the supply line 20 to the coolant pump 12 to prevent blow-off, or minor axial backing off, of a leak check module 30 of the leak check apparatus 10 from sealed relation with the inlet tube 26 to the water pump.

In some applications, the leakage may be reflected in fluid mass flow from the chamber of the pump. That is, the monitoring circuit 22 may be adapted to measure rate or amount of fluid escape from the interior chamber 16, as measured by a reference pressure of the pump chamber 16 and a known measurement of the quantity of air supplied into the chamber 16 to achieve the reference pressure. For example, a particular water pump may be rejected if a leakage is greater than 5 cc/min.

The water pump 12 includes a pump housing 24, which defines a closable interior chamber 16 for receiving engine coolant, the fluid inlet tube 26 for passing coolant liquid into the interior chamber, and a fluid outlet (not shown) for passing coolant from the interior chamber 16 and into the engine (not shown). During a leak test herein, the fluid outlet of the engine is plugged or otherwise fluidly sealed.

As shown best in FIG. 1A, the fluid inlet tube or intake port 26 is generally cylindrical, hollow, thin-walled, axially elongated and centered on a central axis "T", and projects upwardly and away from the pump housing 24. The inlet tube 26 has a forward end face and fluid inlet opening 26a spaced from the pump housing 24 and defines a fluid passage 26b that extends inwardly from the inlet opening 26a and communicates fluid into the interior chamber 16.

The fluid inlet tube 26 of the water pump 12 to be tested is generally cylindrical but may differ as regards the wall thickness as well as the outside and/or inside diameters thereof. Further, the inlet tube 26 may be configured to enable the water pump, or like fluid system, when in operable use with the engine, to fluidly connect to a water hose (not shown).

In an embodiment illustrated herein, the forward end portion of the fluid inlet tube 26 is configured to include an annular rib 27 proximate to the inlet 26a, an annular limit shoulder 29 distal to the inlet, and a cylindrical outer surface 26c that extends between the rib 27 and shoulder 29. The annular rib 27 is formed by a frusto-conical surface that 27a that expands radially outwardly and rearwardly of the inlet end 26a and terminates in a generally vertical end wall 27b, the shaped annular rib being helpful in completing a gripping sealed connection with the interior wall of a water hose when connected thereto.

Importantly, as will be described hereinbelow, a leak check module 30 according to this invention is provided with the sealing assembly 48, which in turn includes a cylindrical bladder seal 56 that is adapted to be subjected to pressurized air from the supply line 20, circumferentially compress, and grip and form a fluid sealed connection around the forward end portion of the inlet tube 26. The gripping of the tube end portion desirably provides an instant leak tight connection wherein the tube end portion is not damaged. The bladder seal 56 has opposite axial end faces 56f and 56r and is adapted to form a leak tight gripping connection to tube ends formed with a different specific shapes, such as with the annular rib 27, beads and barbs, or threaded portions, and such as found on tube assembly reservoirs and cast parts.

Figure 6:
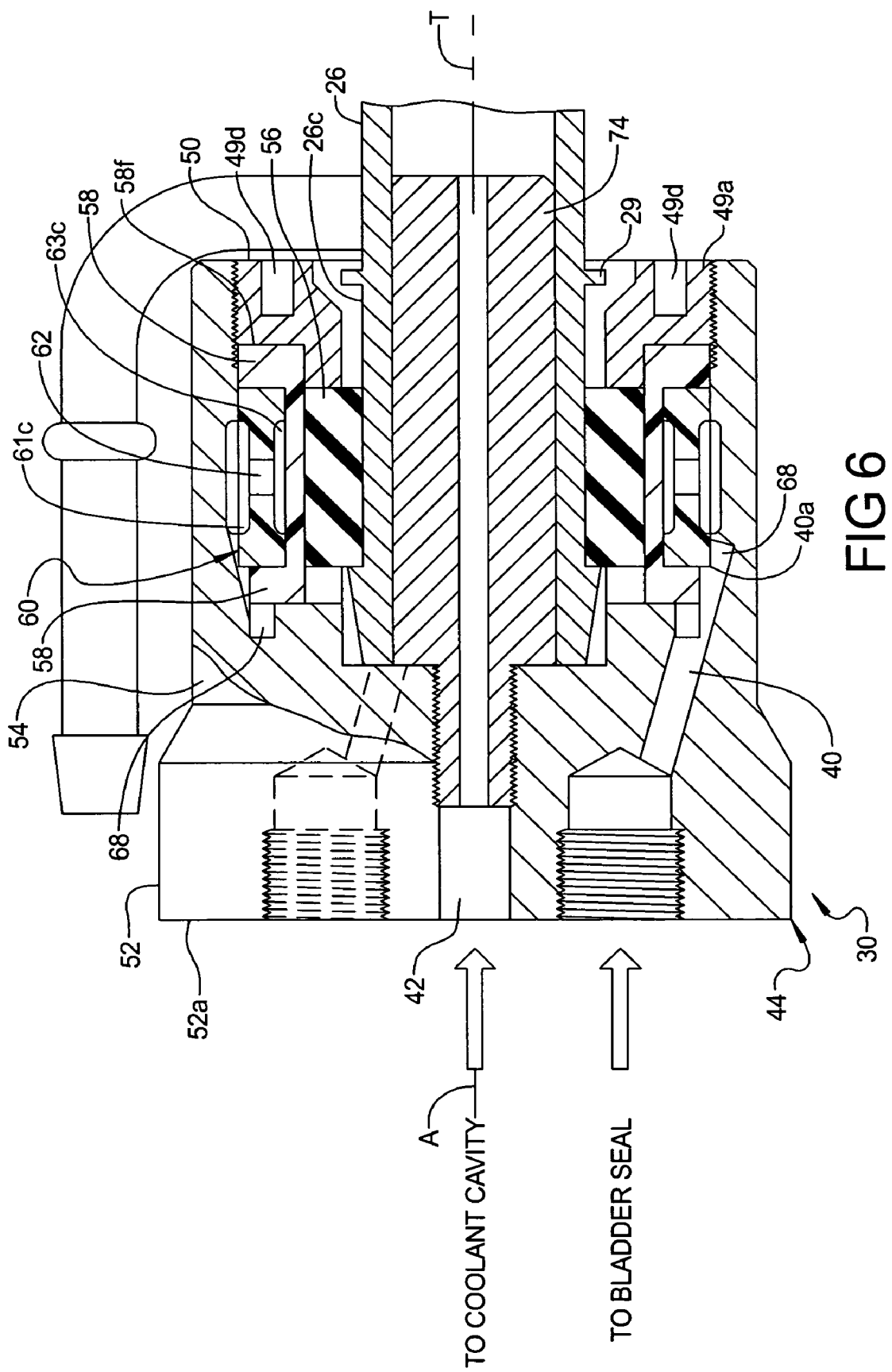
FIG. 6 is a side elevation view in section of the closure cup, a sealing assembly captivated in a receptacle of the closure cup, and the fluid intake port positioned in the closure cup and encircled by the inner bladder seal prior to the seal being compressed into a sealed fitment about the outer periphery of the intake port.

Referring to FIG. 6, the bladder seal 56 encircles the exterior cylindrical outer surface or wall 26c of the inlet tube 26. When the bladder seal 56 is compressed radially inward, the inner face 56b thereof compresses about the outer surface 26c. Preferably, the rearward axial end face 56r of the bladder seal 56, at least in part, is proximate to and juxtaposed with the end wall 27b of the annular rib 27 to resist relative axial withdrawal movement between the bladder seal 56 and the inlet tube 26. Seating of the end face 56f behind the shaped rib 27 inhibits axial blow-off of the inlet tube 26 from the leak check module 30 during pressurized leak testing, thus minimizing potential for injury to the worker.

As shown in FIG. 6, the rearward end wall 27b is substantially radially directed (i.e., disposed in a plane generally perpendicular to the central geometrical axis "T" of the inlet tube) and juxtaposed with the corresponding axial end face 56r of the bladder seal 56.

Further, the cross-section of the annular rib 27 may differ, depending on the water pump being tested. The exterior surface of the shaped rib 27, in cross-section, may have differently angled forward and reward exterior surfaces relative to the tube axis, with one exterior wall surface of the rib being more or less acutely angled, and the surfaces forming a medial knee. The bladder seal in such case might possibly be adapted to engage both of the angled surfaces as well as the knee portion thereof.

The annular rib 27 may not be provided in all situations, depending on the particular application. The shape and decision to provide the annular rib is determined in part by the supplier of the water pump.

The leak check apparatus 10 includes a handle 28, formed by the assembly of a pair of complementary mating side walls 28A and 28B, and the leak check module 30. The handle 28 forms an inlet and outlet end 28a and 28b and the sidewalls 28A and 28B thereof assemble to captivate in separated relation a pair of fluid conduits 32 and 34 for passing high pressure air from the supply source 14 through the handle. The inlet end 28a is adapted to fluidly connect the fluid conduits 32 and 34 to a respective fluid supply line 18 and 20 and the outlet end 28b is adapted to fluidly connect the fluid conduits 32 and 34 to a respective fluid passage 40 and 42 in the leak module 30. A manually operated flow control valve 36 is associated with the handle for selectively permitting or preventing air to flow in the fluid conduit 32 and between the opposite ends 28a and 28b of the handle 28.

The leak check module 30 includes a closure cup 44 having an interior chamber or receptacle 46, the sealing assembly 48, nested in the receptacle, and an end plate 50 for captivating the sealing assembly in the receptacle. The receptacle 46 of the closure cup 44 is adapted to receive and the sealing assembly 48 is adapted to "close about" the inlet tube 26. Then, upon application of pressure from the source 14, the sealing assembly 48 forms a fluid tight sealed connection with the inlet tube 26 and the chamber 16 is pressurized.

In an important aspect according to this invention, the outlet end 28b of the handle 28 may be configured such that the leak check module 30 may be at a desired angle relative to the handle to enable the user to more effectively position the closure cup 44 relative to the inlet tube 26. Referring to FIG. 1, the handle 28 is generally disposed on a central axis "C", and the leak check module 30 is disposed on a central geometrical axis "A", which axis is approximately at an angle "B" of about 45° to the axis "C" of the handle 28. Depending on the application, the outlet end 28b of the handle 28 and the fluid conduits 32 and 34 may be configured such the central axis "A" of the module 30 may be at any desired angle "B" relative to the axis "C" and the end 28b of the handle 28. For example, if the angle "B" is 0°, the closure cup 44 is at a right angle to the central axis "C" of the handle 28. If the angle is 90°, the central axis "C" of the handle 28 and the geometrical axis "A" of the closure cup 44 are coaxially aligned with one another.

The closure cup 44 includes a cylindrical base member 52 having opposite end walls 52a and 52b and a cylindrical sidewall 54 conjoined to the base member and coaxially centered about the geometrical axis "A", the sidewall having a cylindrical interior sidewall surface 54a and a forward end 54b and cooperating with the base member 52 to form the cup-shaped receptacle 46. The end wall 52a of the base member 52 forms the rearward exterior end face of the closure cup, which is connected to the outlet end 28b of the handle 28 and the fluid outlets of the fluid conduits 32 and 34. The end wall 52b forms, at least in part, the bottom of the receptacle 46.

As will be described herein below, an annular recess or air space or cavity 68 is formed at the bottom of the receptacle, and at the junction between the sidewall and the end face 52b of the base member 52.

A pair of fluid passages 40 and 42 extend between the opposite end walls 52a and 52b of the base member 52 and each has, respectively, an inlet formed on the end wall 52b and an outlet 40a and 42a that opens in the receptacle 46. Mating threaded portions are provided at the inlet end portions of the fluid passages 40 and 42 and respective of the fluid conduits 32 and 34 to enable the fluid conduits to fluidly removably connect to a respective fluid passage.

The fluid passage 40 extends through the base member 52 at an acute angle to the axis "A" and the outlet 40a thereof terminates in the annular recess 68 formed at the junction between the sidewall and the endwall 52b of the base member 52. The outlet port 40a is positioned to supply pressurized air into and around the annular recess 68 and thereafter into a cylindrical annular space or separation formed between and about the interior sidewall of the receptacle and the exterior surface of the seal assembly 48.

The fluid passage 42 and outlet 42a thereof are substantially centered on the axis "A" of the closure cup 44 and the outlet 42a is positioned to supply pressurized air into the fluid inlet tube 26.

As will be described, preferably, a hollow cylindrical centering or alignment stem 74 is secured to the base member 52 and projects therefrom, the stem aligned with the axis "A". The stem 74 has a rearward end threadably connected to the outlet 42a and a forward end portion that is coaxially inserted into the fluid passage 26b of the inlet tube 26 and pass pressurized air from the supply line 20 directly into the fluid chamber 16.

The captivating end plate 50 comprises a hat shaped donut that includes an annular ring plate 49, an annular ring sleeve 51, and a cylindrical central opening 53 extending therethrough. The ring plate 49 has upper and lower faces 49a and 49b and an outer circumferential wall 49c. The outer circumferential wall 49c of the end plate 50 and the interior forward end 54b of the cup sidewall 54 are provided with mating thread portions to enable the end plate 50 to removably threadably connect to the closure cup 44, wherein to captivate the sealing assembly 48 in the receptacle 46. When connected, the lower face 49b of the ring plate 49, at least in part, is juxtaposed against the upper end 56f of the bladder seal 56.

Further, to assist in connecting the ring plate 49 to the closure cup 44, a series of spanner holes 49d are provided equiangularly about the upper face 49a for gripping by a spanner wrench wherein to rotate the end plate 50 clockwise and/or counterclockwise, depending on the thread sense and whether the end plate 50 is being mounted to or removed from the closure cup 44. The spanner wrench is not shown as being conventional and understood by those skilled in the art.

The ring shaped sleeve 51 extends from the lower face 49b and has a cylindrical outer wall 51a and terminates in a distal end face 51b. The sleeve 51 is coaxially inserted into the receptacle 46 and into a central cylindrical passage formed by the cylindrical inner wall 59 of an intermediate seal ring 58 in the seal assembly 48. When the sleeve 51 is so fitted, the outer wall 51a thereof is juxtaposed, at least in part, with an upper annular end portion of the inner wall 59 of the seal ring 58 and the end face 51b is snugly juxtaposed atop the distal or upper end face 56f of the bladder seal 56. Following the sealing operation, the axial end faces 56f and 56r of the bladder seal 56 may be forced apart and the upper end may engage the end face 51b.

The central opening 53 extends between the upper face 49a of the ring plate 49 and the distal lower end face 51b of the ring sleeve 51, the opening being coaxially centered with the axis "A" when the end plate 50 is connected to the closure cup 44. The opening or passage 53 is formed by and includes an upper passage wall 53a, which is disposed, at least in part, in the ring plate 49 and opens on the upper face 49a, and a lower passage wall 53b, which is disposed, at least in part, in the ring sleeve 51 and opens on the lower end face 51b. The upper passage wall 53a is generally frusto-conical and tapers inwardly from the upper face 49a and terminates on the lower passage wall 53b. The frusto-conical wall enables the leak check module 30 to accommodate an outward radial extension (i.e., dimension) of the limit shoulder 29 found on some inlet tubes 26. The interior lower passage wall 53b is generally cylindrical and the same diameter as the inner wall 56b of the bladder seal 56.

Figure 2:
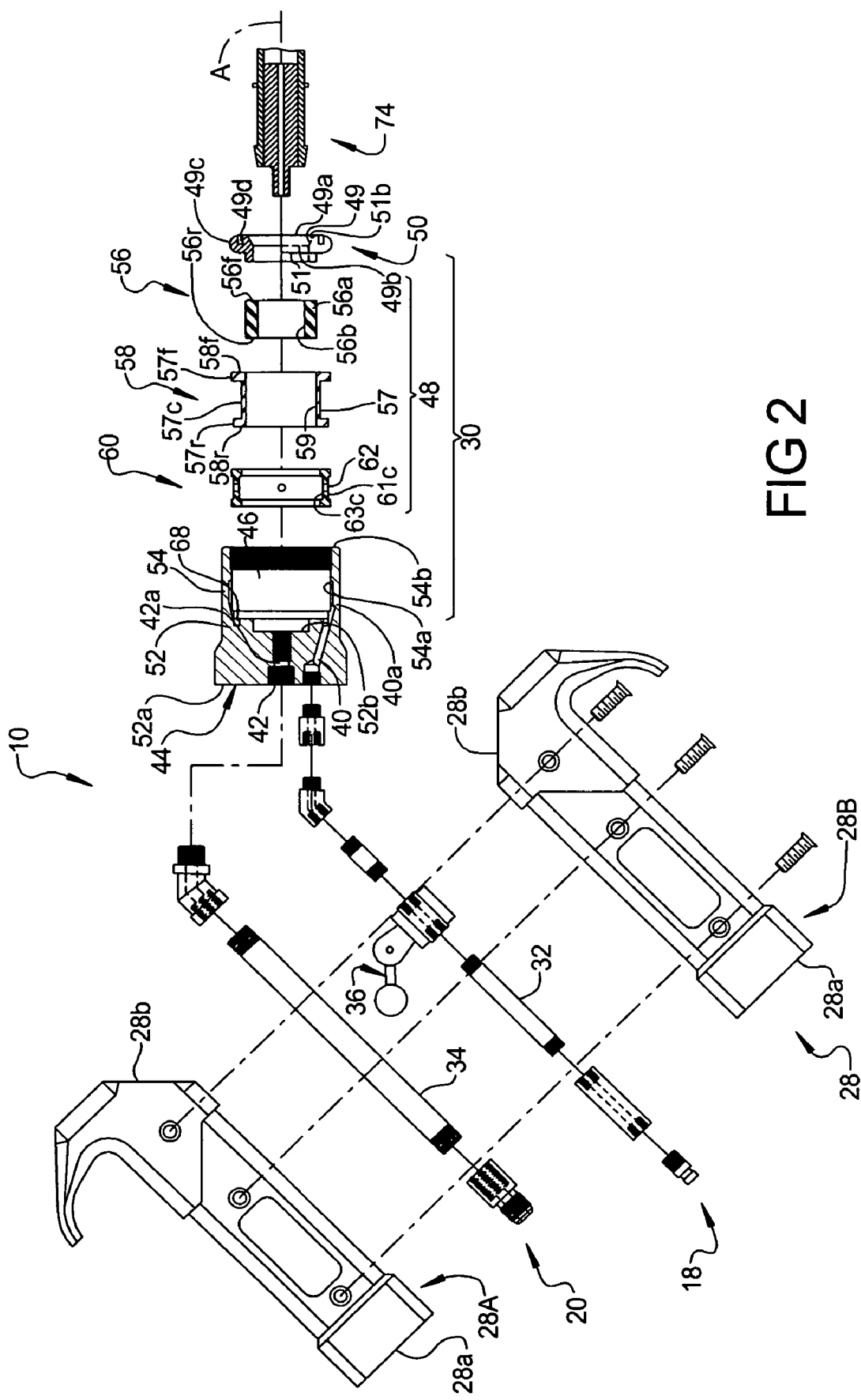
FIG. 2 is an assembly view of the hand-held apparatus of FIG. 1 with certain elements of the leak check module shown in section.

Referring to FIGS. 2 and 4, the sealing assembly 48 comprises the cylindrical inner bladder seal 56, a generally cylindrical intermediate seal activating ring 58, and a generally cylindrical outer packing ring 60. These components 56, 58 and 60 are assembled together to form a unit that is nested inside the receptacle 46 and captivated therein by the end plate 50.

The individual components 56, 58, and 60 of the sealing assembly 48 could be described as a sleeve, a tube, and like terms. As will be understood, whatever the term, these components are comprised of materials that range from relatively rigid (the outer packing ring 60) and semi-rigid or resilient (the intermediate activating ring 58), which generally maintain shape, and compressible (the bladder seal 56), which changes shape to form a fluid seal about the inlet tube 26. For example, the packing ring 60 may be comprised of a metal, such as steel or aluminum. The activating ring 58 may be comprised of a resilient polymer that may yield under pressure.

Preferably, the bladder seal 56 is comprised of a material that will yield and compress. According to this invention, the bladder seal 56 is comprised of an elastomer, such as rubber or other suitable material capable of forming a fluid sealing relationship.

When the sealing assembly 48 is mounted within the receptacle 46, the inner bladder seal 56, the intermediate activating ring 58, and outer packing ring 60 have respective cylindrical inner and outer walls generally coaxially centered about the geometrical axis "A". The packing ring 60 is captivated in encircling relation with and about the outer wall of the activating seal ring 58. The outer wall of the packing ring 60 faces radially outward and is in juxtaposed relation with the non-threaded portion of the interior sidewall 54a.

The bladder seal 56 is generally cylindrical and has outer and inner walls 56a and 56b adapted to centered coaxially on the central geometric axis "A" and forward and rearward ends 56f and 56r. The inner wall 56b is adapted to receive and encircle the inlet tube 26.

In use, under the force of pressurized air, the bladder seal 56 is adapted to compress radially inwardly, wherein the inner wall 56b thereof compresses about and forms an airtight fluid seal about the exterior periphery of the inlet tube 26.

Referring to FIG. 6, the inner wall 56b of the bladder seal 56 is shown positioned about the exterior cylindrical wall portion 26c of the inlet tube 26 with the rearward end 56r juxtaposed with the radial end wall 27b formed by the rearward end of the shaped rib 27 and the forward end 56f juxtaposed against the end face 51b.

The intermediate activating seal ring 58 is generally cylindrical in form and includes outer and inner walls 57 and 59 and forward and rearward ends 58f and 58r. The outer wall 57 is stepped and includes forward and rearward annular ribs 57f and 57r, respectively, proximate to the forward and rearward ends 58f and 58r, and a generally cylindrical annular recess 57c, which recess extends generally coaxially between the ribs 57f and 57r. The inner wall 59 is generally cylindrical and adapted to be snugly juxtaposed in encircling relation about and around the outer wall 56a of the bladder seal 56.

The activating seal ring 58 is comprised of a semi-rigid material that is resilient and will yield under pressure, such as polymer. Importantly, the material is not fully rigid, wherein to maintain a generally cylindrical shape, but is sufficiently resilient or elastic, in order to yield under the force of pressurized air, or an inward circumferential force placed therearound. This inward force on the seal ring 58 causes a reduction in diameter of a central annular band or portion of the wall thereof, causing the wall portion of the ring 58 to contract circumferentially inwardly, around, and against the bladder seal 56, causing the diameter of the bladder seal to reduce in diameter and compress about the tube 26. This diameter change effects an air sealing arrangement around and with the exterior forward end portion of the inlet tube 26.

The outer packing ring 60 is of a lightweight rigid material, such as aluminum, generally cylindrical, and includes forward and rearward ends 60f and 60r. The outer wall 61 is stepped and includes forward and rearward annular ribs 61f and 61r, proximate the respective ends 60f and 60r, and a generally cylindrical annular recess 61c, which recess extends between the ribs 61f and 61r. The inner wall 63 is similar to the outer wall, is stepped, and includes forward and rearward annular ribs 63f and 63r and a generally cylindrical annular recess 63c, which recess extends between the ribs 63f and 63r.

Referring to FIG. 3, the outer packing ring 60 and intermediate seal ring 58 are shown positioned to form a support subassembly "S" with one another.

Referring to FIG. 4, the sealing assembly 48 is shown positioned for assembly in the receptacle 46 of the closure cup 44, showing the packing ring 60 and intermediate seal ring 58 having been formed into the support subassembly "S".

The outer packing ring 60 is snugly seated within the annular recess 57c of the intermediate seal ring 58. So seated, the stepped inner wall 63 and annular recess 63c of the packing ring 60 are juxtaposed with the annular recess 57c of the seal ring 58, and the forward and rearward ends 60f and 60r of the packing ring are fitted against the ribs 57f and 57r. The outer wall 61 and annular recess 61c of the packing ring 60 are juxtaposed with the interior sidewall 54a of the cup wall 54.

Importantly, and critical to this invention, a plurality of apertures or holes or passages 62 extend radially through the cylindrical wall 61 of the packing ring 60 and between the annular recesses 61c and 63c. In the embodiment illustrated, eight cylindrical holes 62 of circular shape are arranged generally equiangularly around the central wall 61 of the packing ring 60.

The holes 62 are in fluid communication with the fluid passage 40 and operate to pass high-pressure air radially inwardly through the packing ring 60, against the seal ring 58. The pressure is sufficient to force the wall of the seal ring inwardly against the bladder seal 56 and the bladder seal into compressed relation against the inlet tube 26.

In this regard, pressurized air is passed vertically from the fluid conduit 40 into the recess 68, upwardly and about the exterior of the packing ring 60 and into the annular recess 61c. The annular recesses 61c and 63c provide an annular air passage on each side of the packing ring 60 to receive and circumferentially distribute and communicate pressurized air 360° about the packing ring.

Air from the passage 40 is then circumferentially circulated and uniformly distributed 360° around the recess 61c, whereupon the air is radially passed through the holes 62 and into the annular recess 63c, and circulated and uniformly distributed 360° about a central annular wall portion of the resilient intermediate seal ring 58.

The central annular wall portion of the resilient seal ring 58 is compressed radially inwardly against a corresponding central annular wall portion of the bladder seal 56. This inward radial pressure forces the central wall portion of the bladder seal 56 radially inwardly and into a compressed sealed relation about the exterior surface 26c of the inlet tube 26.

The annular recesses 61c and 63c and the holes 62 ensure that a substantially uniform pressure will compress the central annular wall portions of the seal ring 58 and bladder seal 56 radially inwardly. That is, the diameters of each are generally uniformly reduced.

Referring to FIGS. 4, 5, and 6, the packing ring 60 is shown when assembled with the intermediate seal ring 58. The packing ring 60 is snugly interfit and seated within the annular recess 57c and extends between the ribs 57f and 57r of the seal ring or sleeve 58. In FIG. 6, in use, the outer wall 61 and associated ribs 61f and 61r of the packing ring 60 and associated ribs 57f and 57r of the seal ring or sleeve 58 are juxtaposed against the interior wall 54a of the cup wall 44.

A cylindrical ring shaped support 64 projects upwardly from the end wall 52b at the bottom of the receptacle 46 and includes cylindrical outer and inner walls 64a and 64b, which are coaxially disposed relative to the axis "A" and the sidewall 54a of the closure cup 44. The support 64 terminates in an end face 64c for supporting and positioning the bladder seal 56 in spaced relation to the end wall 52b. The inner wall 64b of the support 64 and the end wall 52b of the base member 52 cooperate to form a central cup shaped recess 66 at the bottom of the receptacle 46. The outer wall 64a of the support 64, the sidewall 54a of the closure cup 44, and the end wall 52b cooperate to form an annular recess or air space or cavity 68 at the bottom of the receptacle 46, and at the junction between the sidewall 54 and endwall 52 of the cup 30.

The cylindrical side wall 54a is stepped, proximate to the outer annular recess or air cavity 68, and includes a cylindrical shoulder 70 of reduced diameter, the shoulder extending upwardly from the end wall 52b and terminating in an annular end face 72. The end face 72 is spaced below the plane of the end face 64c of the support 64, which forms a stop that engages the rearward end 58r of the intermediate seal ring 58 and defines a downward limit on the seal ring 58 relative to the receptacle 46.

The shoulder 70, in combination with the seal ring 58, cooperates to support and position the packing ring 60 above the end wall 52b and atop the outer annular recess or cavity 68. The outer diameters of the ribs formed at the opposite axial ends of the seal and packing rings 58 and 60 are slightly less than the inner diameter of the side wall 54a, such that a slight cylindrical gap or annular separation is provided between the side wall 54a when the support assembly "S" is supported atop the shoulder 70. The shoulder 70, in part, forms the annular recess 68 at the junction between the sidewall and the base member. The opening 40a supplies pressurized air to the annular recess 68, upwardly to the lower or rearward end of the sealing assembly 48 and into the outer annular recess 61c around the center of the packing ring 60, wherein to distribute the pressurized air 360° about the annular recess 61c, through the holes 62 of the packing ring 60, and into and 360° about the inner annular recess 63c of the packing ring 60.

Preferably and according to this embodiment of the invention, the hollow tubular centering tube or stem 74 is centrally mounted in the receptacle 46 for conducting pressurized air from the passage 42 into the inlet tube 26. The centering tube 74 is axially elongated and has a rearward end 74r, a cylindrical forward end 74f, and a central passage 74c that extends between the opposite ends 74f and 74r. The rearward end 74r is provided with mating thread and threadably removably connected to the threaded bore formed at the opening 42a of the air passage 42. The forward end 74f is adapted to be coaxially inserted into the interior passage 26b of the fluid inlet tube 26. Preferably, the forward end 74f is dimensioned to extend axially forward of the forward end 54a of the closure cup 44 and has a diameter slightly less than the interior diameter of the passage 26b of the inlet tube 26.

The centering tube 74 provides several functions. First and foremost, the centering tube 74 ensures that pressurized air is directly delivered into the inlet tube 26 of the pump housing 24 being tested for fluid leakage. Second, in close cramped or dimly lit working areas, configuring the forward end 74f of the tube 74 to project outwardly from the forward end of the closure cup 44 enables a worker to more rapidly position the closure cup 44 relative to the inlet tube of the work piece and center the centering tube 74 for coaxial insertion into the inlet tube 26. Further, the axially elongated forward end portion of the tube 74 is toleranced to provide a coaxial clearance interfitment with the interior wall of the inlet tube 26 and stability to the connection by inhibiting off-axis wobble.

The forward and rearward ends 58f and 58r of the intermediate seal ring or sleeve 58 are sandwiched between and positioningly engaged by the end face or stop 72 at the end of the annular shoulder 70 in the annular recess 66 and the end face 51b of the sleeve 51 on the captivating end plate 50. As noted, the forward and rearward ends 56f and 56r of the bladder seal 56 are sandwiched between and positioningly engaged by the upper end face 64c of the support 64 and the lower face 49b of the end plate 49.

Desirably, this engagement of the support components 58 and 60 of the sealing assembly 48 and arrangement in the cup 30 inhibits inward radial collapse of the central annular portion of the seal ring 58 when acted upon and forced radially inwardly by pressure from the apertures 62 in the packing ring 60. Additionally, stiffness of the seal ring or sleeve 58 is such that the resilient polymeric material yields under the "ring of pressure" thereabout and the central wall portion thereof provides an annular band that deforms radially inwardly and against the bladder seal 56 to compress an annular band of the elastomeric material of the bladder seal 56 against the inlet tube 26.

In use, the valves 36 and 38 are initially in a closed position, wherein there is no fluid communication between the source 14 and the pump housing 34 to be tested. The leak check module 30 is brought into position with the inlet tube 26 and the centering stem 74 of the closure cup 44 centered with the inlet tube 26, such as by the outwardly extended forward end 74f of the stem 74 being brought into engagement with the free end 26a of the inlet tube 26. The forward end 74f of the stem 74 is inserted into the passage 26b of the tube 26 and the tube end face 26a brought into engagement with the end wall 52b at the bottom of the receptacle 46.

Once the centering stem 74 is centered in the passage 26b, the check valve 36 in the handle 28 is opened. Pressurized air is passed from the supply line 18, through the fluid conduit 32 in the handle 28, through the fluid passage 40 and into the opening 40a in the annular recess 68, and into the outer annular recess 61c around the packing ring 60. The pressured air is then forced through the apertures 62 and into and around the inner annular recess 63c, whereupon the seal 58 is compressed inwardly against the bladder 56, which in turn compresses about the tube 26 and forms a fluid tight fluid seal thereabout.

The pressure gauge 22a monitors the pressure supplied to form a pressure seal with the outer periphery of the inlet tube 26. When the predetermined pressure is achieved, the valve 36 is closed and the pressure maintained.

The valve 38 is opened, whereupon pressurized air passes from the supply line 20, through the fluid conduit 34 in the handle 28, through the fluid passage 42 and the center passage 74c in the centering stem 74, and into the chamber 24. The pressure gauge 22b monitors the pressure supplied to the chamber 24. When the chamber 24 reaches a predetermined pressure, the valve 38 is closed and the chamber maintained at the preset level.

The read out gage 22c of the monitoring apparatus 22 monitors the pressure in the chamber 24 and provide a visual read out of a parameter of interest, such as any drop in the chamber pressure measured by a predetermined time interval, or the chamber pressure. A drop in the pressure monitored indicates that a leak is present in the pump housing.

In the embodiment illustrated, the bladder seal 56 compresses about the inlet tube 26 at a location rearwardly of the shaped rib 27. In this arrangement, the forward end 56f of the bladder 56 is proximal to the rearward end face 27b of the shaped shoulder 27 to inhibit blow off of the leak check module 30 from sealed engagement with the inlet tube 26.

Additional preferred embodiments of leak check modules according to this invention are configured for use in leak testing fluid apparatus having an inlet or outlet that is much greater in diameter than that of the inlet tube 26 described herein above and thus these embodiments of leak check modules do not include a centering stem 74. Illustrative of such fluid apparatus to be tested for leakage are the turbine and compressor unit of an automobile.

Figure 7:
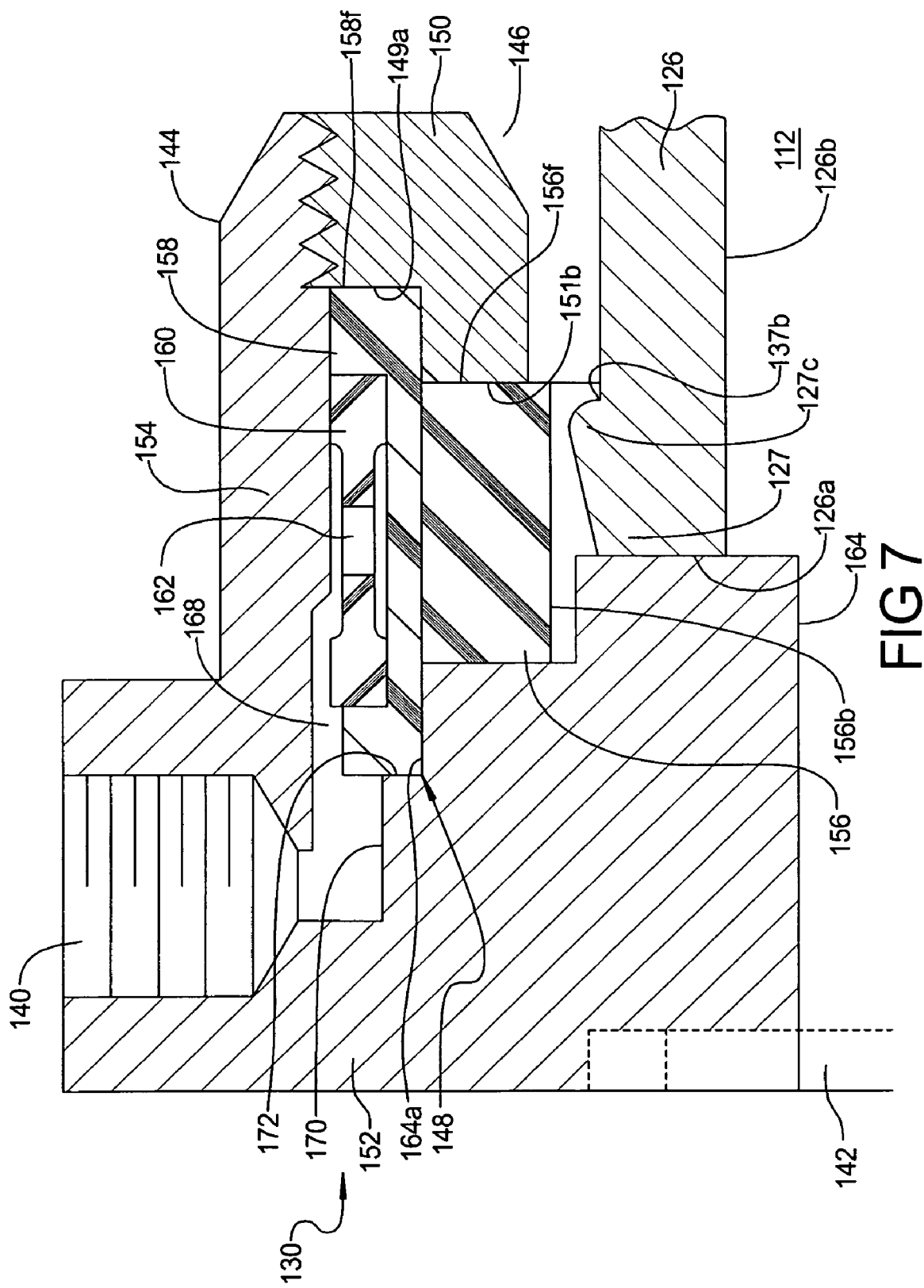
FIGS. 7 and 8 are partial side elevation views, in section, of additional preferred embodiments according to this invention, of leak check modules for leak testing connection about the inlet and/or outlet to a fluid compressor of an automobile engine, the modules being adapted to be controlled and positioned by a robotic system.
Figure 8:
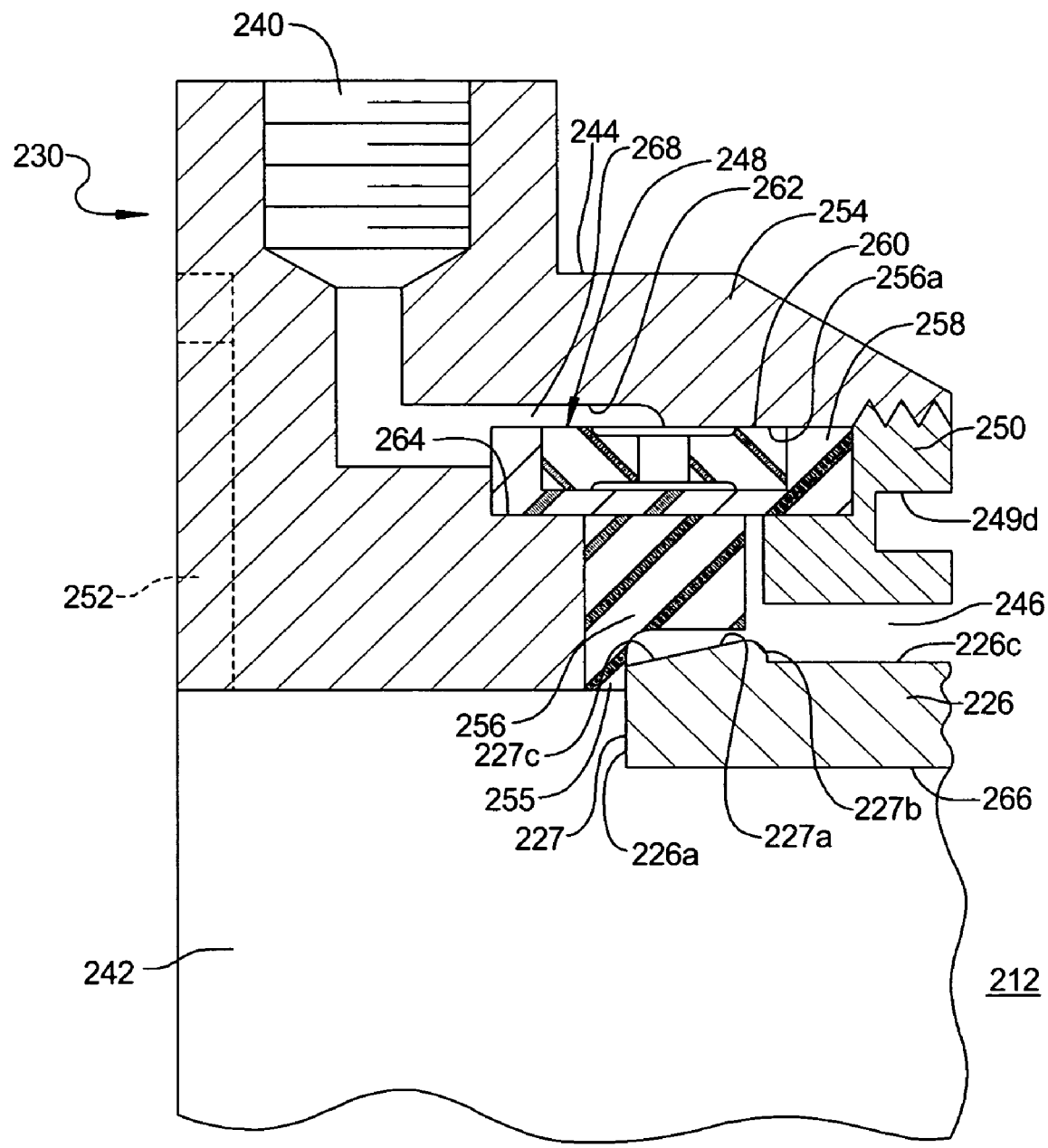

Turning to FIGS. 7 and 8, leak check modules 130 and 230 are shown positioned for connection to the inlet and outlet of a turbine and compressor units 112 and 212 of an automobile. The components of the leak check modules and the connection structure of the unit to be tested for leakage are similar to that described herein above in relation to the leak testing of the water pump 12.

Additionally, in use, the leak check modules 130 and 230 are not hand held but mounted to a robot (not shown). The robot sequentially controls the position of the leak check module(s) and the pressure supplied to the modules(s) as the units being tested are advanced along an assembly line.

As described above, regarding the leak check module 30, the outer diameter of the stem 74 may be about 1¼ inch, and be adapted to clearance fit into the passage of the inlet tube 26, the inner diameter of the bladder 56 may be about 1⅞ inches, and seal about the inlet tube, and the inner diameter of the closure cup 44 may be about 2⅝ inches. In contrast, in the leak check modules 130 and 230, the inner diameter of the bladder 156 and 256 may be about 4¼ inch, and the inner diameter of the cup 144 and 244 may be about 4⅞-5.0 inches. In each case, however, the bladder seal in the closure cups 44, 144, and 244, respectively, may be about ¼ inch thick.

Turning to FIG. 7, a leak check module 130 is positioned about the inlet collar 126 to a compressor, generally indicated by the reference numeral 112. The inlet collar 126 is generally cylindrical, terminates in an end face or inlet 126a, has an interior passage 126b, and cylindrical outer surface 126c. Further, the inlet collar terminates in a shaped annular rib 127 having a frusto-conical surface 127a that expands radially outwardly from the surface 126c, a generally vertically disposed end face 127b, and a rounded crest 127c.

The leak check module 130 comprises a cylindrical cup shaped closure cup 144, a sealing assembly 148 mounted in the receptacle, and an end plate 150 for captivating the sealing assembly in the receptacle, each generally component centered along a common central geometric axis "A". The cup 144 includes a base member 152 and a cylindrical sidewall 154.

A cylindrical support 164 projects from the end wall 152 and is coaxially centered in the receptacle. A continuous 360° annular recess or air cavity 168 is formed at the bottom of the receptacle and between the end wall 152, the sidewall 154a, and the outer wall 164a of the support 164. An annular shoulder 170 is formed in the recess and provides a stop 172 for positioning the sealing assembly, at least in part.

A fluid passage 140 extends through the base member 152 and, at least in part, into the sidewall 154 and supplies pressurized air from the source of air pressure to an opening 140a that opens in the annular recess or air cavity 168.

The sealing assembly 148 includes an outer packing ring 160, an intermediate seal 158, and an inner bladder or seal 156, each generally cylindrical and coaxially centered along the geometric axis of the module when mounted into the receptacle thereof. The packing ring and seals 160, 158, and 160, respectively, are generally as described hereinabove and comprised of the materials as described.

When the sealing assembly 148 is positioned inside the receptacle 146, the seal ring 158 is abutted against the stop 172 and the packing ring 160 is snugly fit within the outer annular recess of the seal ring 158 in a manner as described herein above. The inner wall of the bladder seal 156 is dimensioned to encircle the outer wall of the support 164 and the shaped end portion 127c of the inlet 126.

When the end plate 150 is threadably connected to the module 130, the lower end faces 149a and 151b thereof, respectively, abut the forward end 158f of the seal ring 158 and the forward end 156f of the bladder seal 156.

The inlet collar 126 is inserted into the receptacle such the end face 126a thereof is abutted against the end face of the support 164. So positioned, the inner wall 156b of the bladder seal 156 completely encircles the shaped rib 127.

As described above, pressure is supplied to the conduit or passage 140, that opens in the recess 168, whereupon air passes upwardly to the packing ring 160, into and 360° around the outer annular recess thereof, through the openings 162, into and 360° around the inner annular recess thereof, and against the seal sleeve 158. This pressure forces the central annular wall portions of the seal sleeve 158 and bladder seal 156 radially inwardly and an annular wall portion of the bladder seal 156 into 360° sealed relation with the exterior of the collar 126 and the shaped rib portion 127 thereof. Air is then passed through the center passage 142 to pressurize the interior chamber of the compressor under test, in a manner similar to that described herein above.

Turning to FIG. 8, the leak check module 230 is positioned about the outlet collar 226 of a compressor, generally indicated at 212. The outlet collar 226 is generally cylindrical and terminates in an outlet or end face 226a. The collar 226 has an outer periphery formed by a rib 227 having forward and rearward end portions 227a and 227b and a medial crest 227c, the rearward end portion 227b spaced rearwardly from the end face 226a.

The leak check module 230 is similar to that described for the compressor inlet but differs in that the inner seal or bladder seal 256 of the sealing assembly 248 thereof is cup-shaped and comprises a hollow cylindrical sleeve or wall 256c, similar to that described above, and a generally planar base or seal plate 255. The seal plate 255 radiates inwardly from the rearward end of the sleeve 256c and forms a central opening. In use, the lower face of the seal plate is abutted against a central support 264 of the module 230.

The leak testing operation is as above described. Fluid pressure is delivered through the base member and side wall 252 and 254, into the air passages 240 and 242 therein, into a continuous 360° annular recess or air cavity 268 about the lower end of the support 264, which recess is in fluid communication with the passage 240, upwardly, into and between the outer and inner annular recesses and apertures 262 in the packing ring 260, whereupon the intermediate seal ring 258 and inner bladder seal 256 are compressed inwardly towards the center axis and about the shaped portion 227 of the collar 226.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. An apparatus for testing a sealed fluid system for leakage, said fluid system including an interior fluid chamber and a fluid inlet tube having a forward end portion and terminating in an opening for receiving and communicating pressurized fluid into said fluid chamber, the apparatus comprising:
- an adapter body, said body including a base member having an endwall, a sidewall conjoined to and extending forwardly from said endwall to form an outwardly open cup shaped receptacle and a cylindrical annular channel at the junction of said walls and interiorly of said receptacle, said receptacle being sized to receive and fit about the forward end portion of said inlet tube,
- a cylindrical seal assembly disposed in said receptacle and juxtaposed, at least in part, above and in covering relation with said annular channel, said seal assembly in spaced circumposed encircling relation with said sidewall wherein to form a cylindrical annular gap therebetween and in fluid relation with said annular channel, said seal assembly including at least one fluid inlet port and a hollow cylindrical bladder seal of compressible material, said bladder seal having inner and outer surfaces and said fluid port being adapted to direct pressurized air from said annular gap against the outer surface of said bladder seal and compress said inner surface into a fluid sealed engagement with said forward end portion when the inlet tube is in said receptacle, and,
- first and second fluid passages, said fluid passages being separate and apart from one another and connectible to a respective source of fluid at high pressure to supply fluid into said receptacle, said first passage being fluidly connected to the annular channel to supply pressurized air into the annular gap formed between the seal assembly and the sidewall, and said second passage being adapted to supply pressurized air into the opening of said inlet tube when the tube is received in said receptacle,
- wherein pressurized air from the first fluid passage is received by and passes through said inlet port and circumferentially compresses the bladder seal radially inwardly and into air tight sealed relation with the forward end portion of the inlet tube, and the second passage supplies pressurized air into the inlet tube and pressurizes said fluid chamber.

2. The apparatus of claim 1, further comprising a handle member, said handle member being axially elongated and including a lower inlet end, an upper outlet end disposed at an angle to said lower inlet end, and first and second fluid conduits, said upper outlet end being removably connectible to the endwall of said adapter body, and said fluid conduits extending between said inlet and outlet ends and comprising, at least in part, said first and second fluid passages for connecting the fluid source into the cup-shaped receptacle of said adapter body.

3. The apparatus of claim 1, further wherein:
- said seal assembly comprises a subassembly of an outer packing sleeve of rigid material interlocked with an inner activating ring of resilient material, the subassembly being circumposed about the outer surface of the bladder seal and having annular lower and upper end portions with the packing sleeve including the air pressure inlet port for compressing the activating sleeve against the activating sleeve and the bladder seal inwardly,
- said bladder seal is hat-shaped in cross-section and includes a flat circular lower portion and an annular upper portion, the portions forming a centrally apertured cup for receiving the forward end portion of the fluid inlet port with the with lower portion being defined, at least in part, by a flat lower surface that seats atop the endwall, a flat upper surface and a central opening that, at least in part, forms the second fluid passage and extends through the lower portion, and the upper portion forming an annular wall that extends upwardly from the flat upper face, the forward end of the fluid inlet tube being adapted to engage and compress against the flat upper surface of the lower portion, and
- an annular ring shaped captivating lid, said captivating lid having upper and lower surfaces and an outer periphery adapted to connect to the sidewall and captivate the seal assembly in the receptacle, a cylindrical wall extending between the lid surfaces and forming a central passage for receiving and passing the forward end portion of the fluid inlet tube, and an annular collar extending from the inner surface and terminating in an annular endface, wherein the annular collar forms with the sidewall an annular chamber for captivating the upper end portion of the subassembly, and the annular endface of the lid being positioned against the upper axial endface of the bladder seal.

4. The apparatus of claim 1, further comprising:
- a first and a second valve for selectively permitting pressurized air to pass from the source of pressurized air to said receptacle, said first valve being associated with the first passage and controlling the flow of air into the annular channel, and the second valve being associated with the second passage and controlling the flow of air into the inlet tube, and
- means for measuring and indicating any change, if any and over time, of the pressure in the fluid chamber.

5. The apparatus of claim 4, wherein said means for measuring and indicating comprises:
- first means for measuring the pressure in said first passage,
- second means for measuring the pressure in said second passage, and
- means for providing an indication of the difference in the pressures in the first and second passages.

6. The apparatus of claim 5, wherein the difference in pressures is measured over a predetermined time, the difference being reflective of air leaking from the chamber being tested.

7. The apparatus of claim 1, further comprising:
- an annular ring shaped captivating lid for removably retaining said seal assembly in said receptacle, said lid having a circular central opening for passing said fluid inlet tube into said receptacle, and wherein:
- said seal assembly extends between said annular channel and said captivating lid and comprises an outer packing sleeve and an inner activating sleeve disposed in interlocked relation with one another and in encircling relation about said bladder seal and extending between said annular channel and said closure lid, said activating sleeve including a cylindrical resilient wall juxtaposed around the outer surface of said bladder seal and opposite axial end faces, respectively, juxtaposed with said annular channel and said captivating lid, and said packing sleeve including a cylindrical rigid wall juxtaposed with said resilient wall and said one fluid port to pass pressurized fluid from said first passage against the resilient wall and force the resilient wall radially inwardly against the bladder seal.

8. The apparatus of claim 7, wherein the cylindrical rigid wall of said outer packing sleeve is formed to include an outer and an inner annular recess and a plurality of fluid ports, said ports being angularly spaced from one another and extending radially between said annular recesses, and each said annular recess being adapted to distribute air circumferentially about the packing sleeve and into the fluid ports, said outer annular recess receiving and passing pressurized air from the annular channel radially inwardly through the ports and into and around the inner annular recess and against the resilient wall of the activating sleeve causing the resilient wall thereof to force the bladder seal radially inward.

9. The apparatus of claim 7, wherein said outer packing sleeve is comprised of relatively rigid metal and said inner activating ring is comprised of a resiliently deformable elastomer or polymer material.

10. The apparatus of claim 7, wherein the outer packing sleeve and inner activating sleeve are axially elongated and generally cylindrical and the opposite axial end portions of each respective sleeve forms a radially outwardly extending rib, the outer packing sleeve nesting in snug encircling fitment around and between the ribs of the activating sleeve and the outward radial extension of the ribs of said packing and activating sleeves coaxially centering the seal assembly with the central geometric axis if the cup-shaped receptacle.

11. The apparatus of claim 1, further comprising means for aligning and coaxially centering the inlet tube with said cup shaped receptacle.

12. The apparatus of claim 11, wherein:
said first passage terminates in a fluid outlet, said fluid outlet being formed in the endwall of said base member and centered with the interior sidewall of said receptacle, and
said means for aligning and coaxially centering comprises an axially elongated hollow centering stem having rearward and forward end portions and a fluid passage extending between said end portions, said rearward and forward end portions, respectively, being fixed to said fluid outlet and adapted to be received in close toleranced centering fitment within said fluid inlet tube, the centering stem coaxially aligning the seal assembly with the fluid inlet tube and passing pressurized fluid directly into the fluid chamber to be tested.

13. The apparatus of claim 12, wherein the cylindrical wall is frusto-conical and opens outwardly to accommodate fluid inlet tubes provided with ribs, barbs and the like that project outwardly from the outer periphery of the inlet tube.

14. The apparatus of claim 12, further comprising:
a ring shaped captivating lid, said captivating lid including upper and lower surfaces and a circular central opening extending between the surfaces, the upper surface forming a forward end of the cup shaped receptacle, and the lower surface being adapted to engage an upper end portion of said seal assembly and captivate the lower end portion of the seal assembly at the endwall of the base member, and
means for connecting the captivating lid to the receptacle, the means for connecting including the sidewall and the captivating lid being provided with complementary interengageable thread, and further wherein
said centering stem is axially dimensioned such that the forward end thereof extends axially forward of the captivating lid, the forwardly extended end enabling the stem to be used to contact the fluid inlet port to find the inlet opening thereof and facilitate insertion of the fluid inlet tube into the centering stem.

15. The apparatus of claim 12, further comprising:
a cylindrical support wall, said support wall extending from the endwall in coaxially centered relation to said sidewall and said centering stem and forming, at least in part, the annular channel, an annular endface, and an inner or second annular channel between the support wall and the centering stem, and
an annular captivating lid for captivating the seal assembly in said receptacle and said bladder seal therewithin and in a manner that opposite axial ends of the bladder are between the lid and the endwall,
wherein the annular end face is juxtaposed for supporting relation with the inward axial end of the bladder seal, and
wherein the seal assembly is, at least in art, disposed in the first annular channel.

16. The apparatus of claim 15, further wherein the separation between the annular endface of the support wall and the annular endwall of the second annular channel is such that a radially outwardly extending annular rib formed on the forward end portion of the fluid inlet tube is retained between the inward axial end of the bladder seal and the endwall forming the second annular channel, and further wherein the inward axial end and inner surface of the bladder seal, respectively, seat atop the annular end face and encircle the fluid inlet tube.

17. The apparatus of claim 12, further comprising:
a cylindrical annular support wall, said support wall extending from the endwall in coaxially centered relation to said sidewall and forming, at least in part, and in sequence, the annular channel, an intermediate second annular channel, and an annular endface, and
an annular captivating lid for captivating the seal assembly in said receptacle and said bladder seal therewithin and in a manner that respective axial ends of the bladder seal engage the lid and the endwall forming the second annular channel,
wherein the seal assembly is, at least in art, disposed in the first annular channel.

18. The apparatus of claim 17, further wherein the annular support wall includes cylindrical inner and outer walls that terminate in the annular endface, the outer wall being juxtaposed with the inner surface of said bladder seal and the inner wall forming, at least in part, said second fluid passage, with the axial separation between the annular endface of the support wall and the captivating lid being such that a radially outwardly extending annular rib formed on the forward end portion of the fluid inlet tube is received therebetween and the inner surface of the bladder seal extends between the endwall of the second annular channel and the captivating lid wherein to compress about the annular rib of the fluid inlet tube.

19. A leak check module for detecting fluid leakage from a fluid system comprised of parts separately assembled or cast, the fluid assembly defining an interior fluid chamber and including a fluid inlet tube having a center passage for communicating fluid into the fluid chamber, the leak check module comprising
a housing having a cylindrical sidewall and a base member that are conjoined to form an outwardly open cup shaped receptacle for receiving and encircling said inlet tube, an annular recess formed, at least in part, in said receptacle and at the junction between said sidewall and said endwall, first and second fluid passages in said base member for supplying pressurized air into the receptacle, said passages separated from one another with said first fluid passage for communicating pressurized air into the center of said receptacle and into said inlet tube when said inlet tube is received in said receptacle and said second passage for communicating pressurized air into the annular recess,
a seal assembly dimensioned for fitment within the receptacle and in spaced relation with the sidewall thereof to form an air passage in fluid relation with the annular recess, the assembly including a compressible bladder seal for forming a fluid seal about the fluid inlet tube, and means for passing high pressure air from the annular recess and air passage against the bladder seal and circumferentially compress the bladder seal inwardly, a hollow centering stem, said stem in fluid communication with the first passage and adapted to interfit within the fluid inlet tube and pass high pressure air into the fluid chamber, and a centrally apertured captivating lid for captivating the seal assembly in said receptacle.

20. The leak check module of claim 19, wherein:

said seal assembly comprises a hollow cylindrical actuating sleeve of resilient polymeric material, the actuating sleeve including a cylindrical wall having a medial annular wall portion, a hollow cylindrical packing sleeve of rigid material, the packing sleeve having, respectively, an outer and an inner annular recess, and said means for passing a plurality of fluid apertures extending between the annular recesses, and wherein said assembly further comprises:

means for connecting the sleeves to one another and positioning the fluid apertures and respective recesses to communicate fluid from the first passage and distribute fluid 360° both about the annular recesses and against the annular wall portion of the activating sleeve.

* * * * *